June 19, 1928. 1,674,557
K. MAYBACH
CONTROLLING THE TRANSMISSION GEAR OF MOTOR VEHICLES
Filed Feb. 4, 1925 4 Sheets-Sheet 4
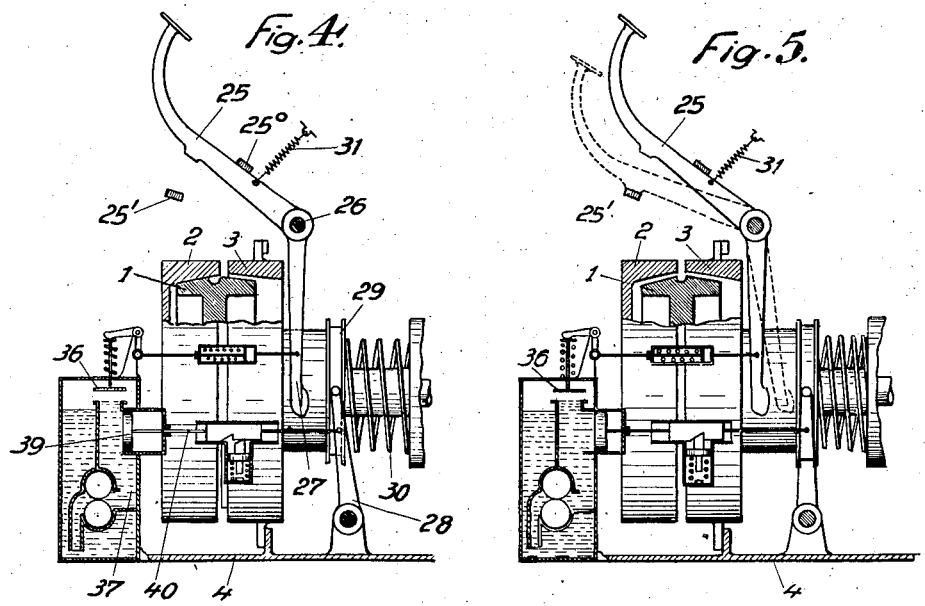
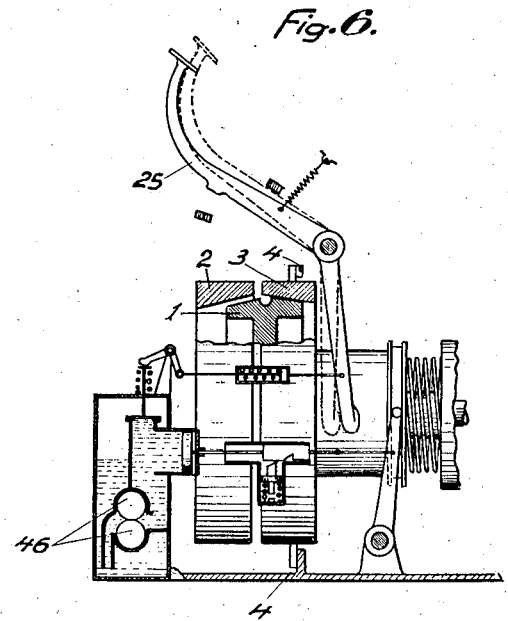
Inventor:
Karl Maybach Patented June 19, 1928.

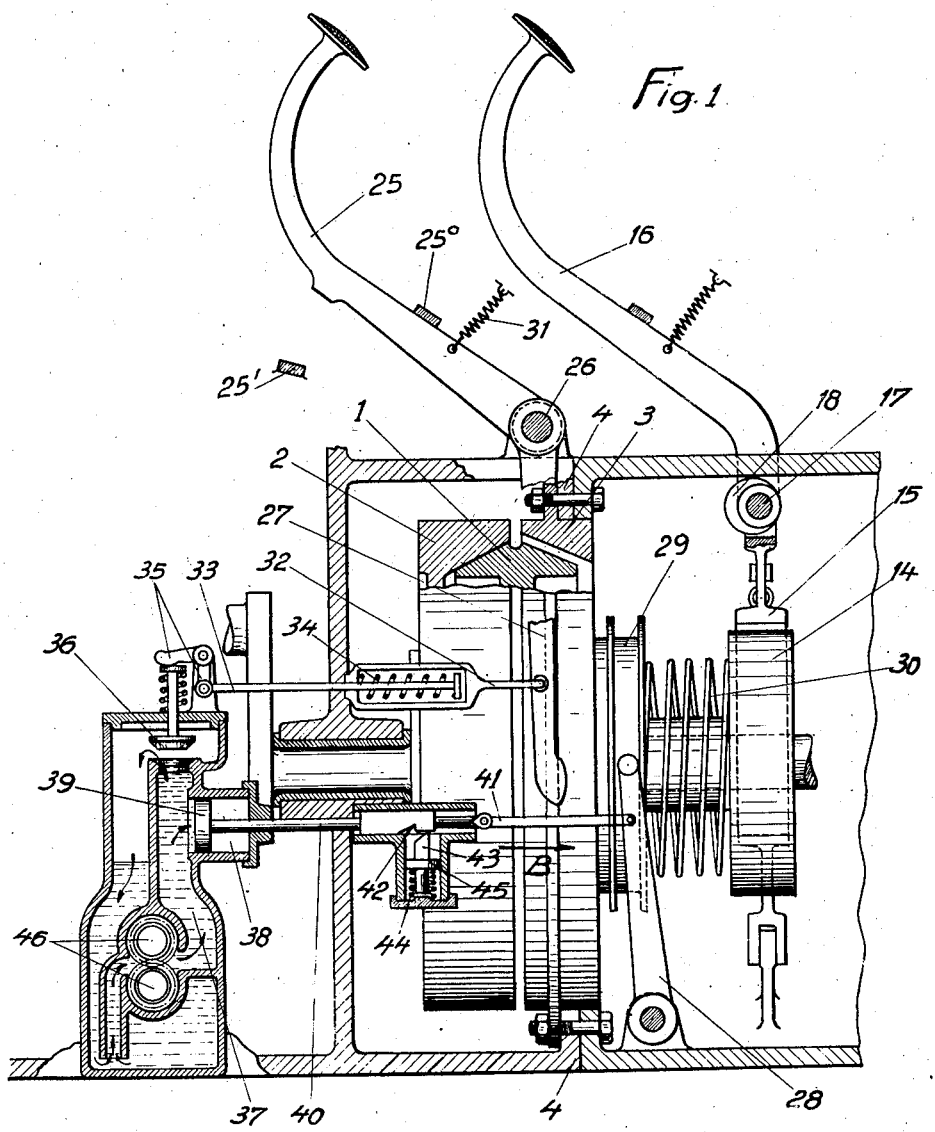

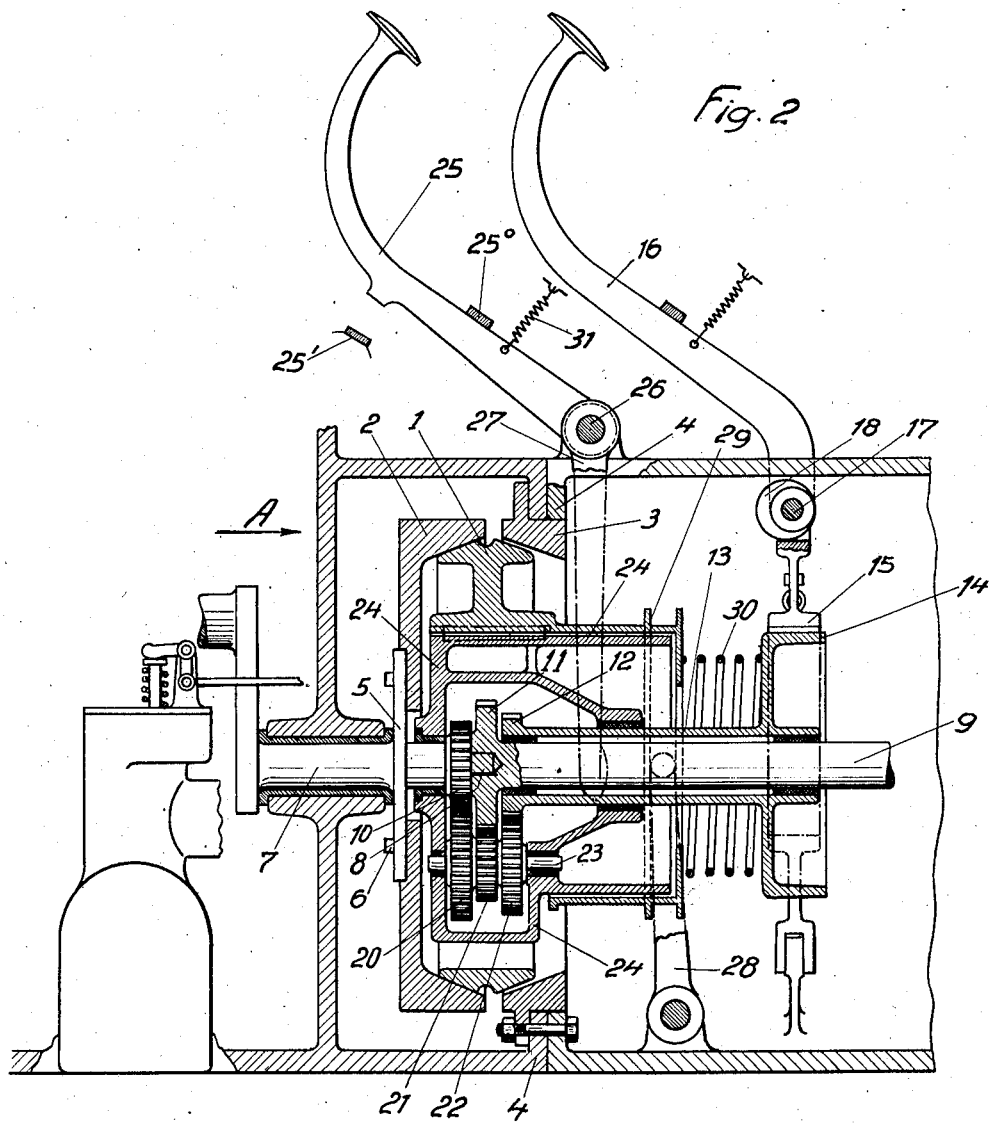

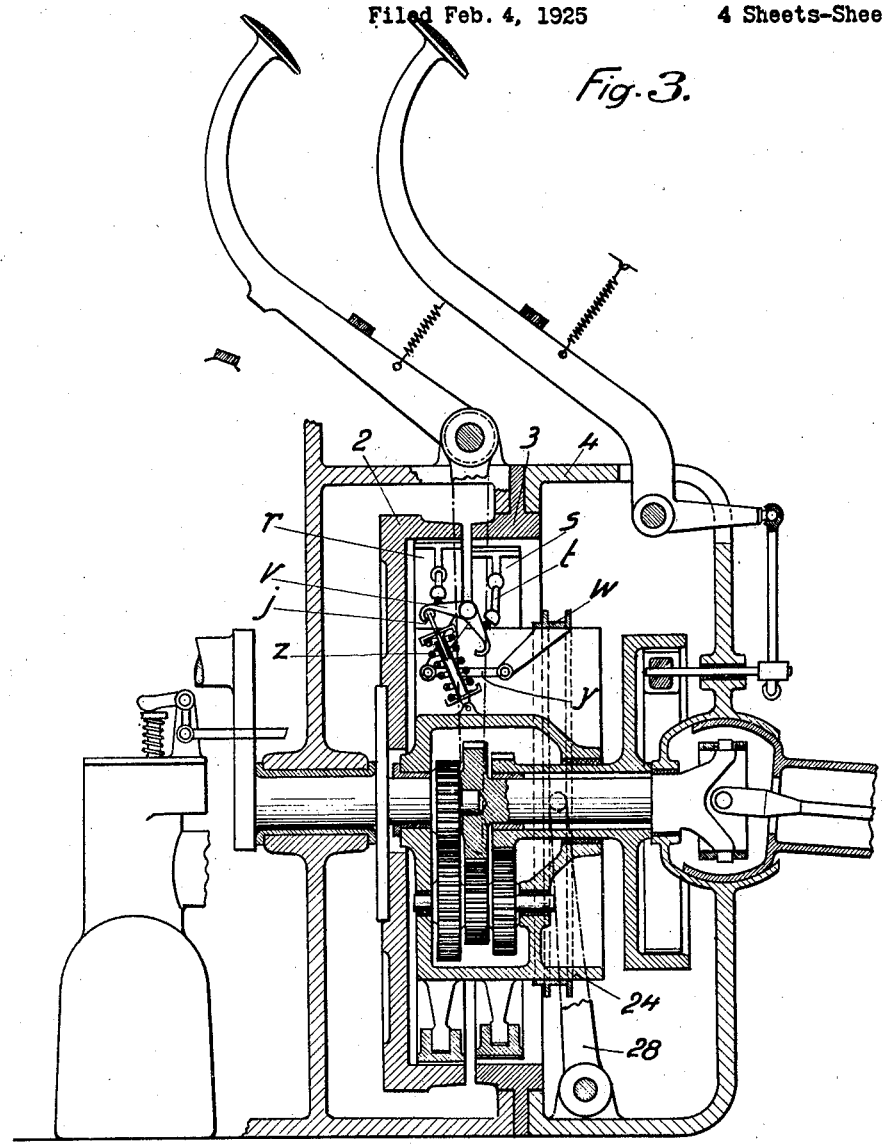

1,674,557

UNITED STATES PATENT OFFICE.

KARL MAYBACH, OF FRIEDRICHSHAFEN, BODENSEE, GERMANY, ASSIGNOR TO THE FIRM MAYBACH MOTORENBAU GESELLSCHAFT MIT BESCHRÄNKTER HAFTUNG, OF FRIEDRICHSHAFEN, BODENSEE, GERMANY.

CONTROLLING THE TRANSMISSION GEAR OF MOTOR VEHICLES.

Application filed February 4, 1925, Serial No. 6,893, and in Germany February 8, 1924.

My invention relates to improvements in controlling the transmission gear of motor vehicles and more especially to a change speed gear.

According to my invention I provide a hydraulic auxiliary device besides the usual lever operating the speed gear. This auxiliary device again controlled by the operating lever is arranged so as to operate in one direction only. If for example a gear with two kinds of speed be provided the foot lever will serve for actuating the means for the first speed while the auxiliary device actuates the second speed. Such arrangement will be of special advantage with a planet wheel gear where there is a change clutch system. Here it would be rather difficult and troublesome for the driver to force in the clutch for the second speed all the time for example while riding up steep roads. Therefore I provide the auxiliary device which will do this work after being set to operate by the foot lever. This auxiliary device may for instance be a hydraulic one and the liquid used may be oil under the pressure of a motor driven oil pump.

Furthermore the arrangement may be made so that normally the clutch for the first speed is held coupled by means of a spring against the pressure of which the foot lever may uncouple the clutch whereas the clutch for the second speed is coupled by the auxiliary device and is uncoupled automatically on release of this device.

The auxiliary device is controlled by the foot lever in such manner that the device effects the second clutch in its coupling direction only. I prefer to combine the operation of foot lever and auxiliary device by special controlling mechanism so that on the first movement of the lever over its working angle the direct or first speed is uncoupled and that the respective clutch parts are locked in this position, whereas a second movement of the lever causes the auxiliary device to couple the second speed which will be uncoupled as soon as the lever is released. Further means may be provided which upon such release automatically couple the first speed.

Having given a general description of my invention I now want to point it out in detail referring to the drawings which represent examples embodying my invention.

Fig. 1 is a side elevation of the entire arrangement wherein the hydraulic auxiliary device and the upper portion of the clutch members are shown in section.

Fig. 2 is a like side elevation showing all parts except the hydraulic auxiliary device in section.

Fig. 3 represents the same as Fig. 2 but with a different construction of the inner clutch system.

Figs. 4, 5 and 6 are side elevations corresponding to Fig. 1 and showing the different positions of the device in operation.

The inner clutch member 1 in its middle portion encloses an epicyclic gear comprising sun wheel 10 fixed on engine shaft 7, sun wheel 11 belonging to shaft 9, and sun wheel 12 on sleeve 13 connected to drum 14 which may engage with brake cheeks 15.

Member 1 may engage with outer clutch member 2 which may be the fly wheel connected to disc 5 by screws 6 thus rotating together with engine shaft 7 the end 8 of which loosely extends into the adjoining end of driven shaft 9.

Member 1 may engage also with outer clutch member 3 which is in rigid connection with the casing 4.

Planet wheels 20, 21 and 22 engage with sun wheels 10, 11 and 12, respectively. They are fixed on shaft 23 carried by the drum like carrier 24. Keyed to this carrier 24 but movable in axial direction is clutch member 1. Foot lever 25 pivoted at 26 with its downwardly extending arm 27 may move lever 28 engaging with rim 29 in the right hand direction thereby causing member 1 to be uncoupled from member 2 against the pressure of spring 30 tending to press member 1 in the left hand direction.

Lever 27 is connected to a rod combined of two portions 32 and 33 which are in resilient connection with each other by means of spring 34. The free end of rod portion 33 is connected to bell crank lever 35 controlling the shaft of valve 36 of the hydraulic auxiliary device. This comprises oil pump 46 causing the oil to run in the directions shown by the arrows and to press on piston 39 working in cylinder 38 as soon as valve 36 closes pressure chamber 37. Piston rod 40 is linked to rod 41 which is again linked to lever 28, so that pressure on piston 39 will result in movement of lever 28. Piston rod 40 near to its right hand end has a notch 42 into which bolt 43 is pressed (by means of spring 44 resting on collar 45) as soon as the notch is moved opposite to the bolt, thereby locking rods 40 and 41 and also lever 28 against backward movement in the left hand direction. Notch 42 and bolt 43 are so situated relative to each other that the locking position corresponds to the neutral position of clutch member 1 when it is uncoupled from member 2 and also from member 3.

The whole arrangement will work in the following way:

For starting the vehicle foot lever 25 is pressed downwardly until reaching stop 25', which position is shown in dotted lines in Fig. 5 equalling the free run position of the gear. In this position the clutch system is arrested by the aforesaid locking device. Upon release foot lever 25 will move back to stop 25°. The engine is still idle. Now the starting switch will be actuated and the engine starts. Again the foot lever is pressed down but only for a small angle to the position shown in full lines in Fig. 6. By this movement valve 36 is closed and while the engine begins to revolve the rising pressure of the circulating oil causes clutch member 1 to be shifted into the position shown in Fig. 6. In this step shaft 9 is driven at reduced speed. Upon release of lever 25 the oil pressure will vanish and spring 30 will move clutch member 1 from engagement with member 3 to engagement with member 2. This movement has to be so sudden that notch 42 will pass over bolt 43 without allowing it to be locked. To secure such functioning I have made a special construction which is shown in my U. S. Patent 1,549,100. Thus the position shown in Fig. 4 is attained, which means that the vehicle is moving with first speed in direct drive.

In order to attain this automatic starting of the vehicle in a perfect manner there may be used elastic means interposed in the pressure chamber of the oil pump or in the shifting mechanism of the coupling member 1.

My invention is capable of various modifications to adapt the invention to varying conditions of application without deviating from the spirit of the invention.

So for instance my improvements may be employed in connection with a transmission gear constructed in accordance with my U. S. Patent 1,505,159, of Aug. 19, 1924. Such construction is shown in Fig. 3 of my present specification. At diametrically opposite points of the planet wheel carrier 24 there are linked to clutch member 1 annular segments $r$ and $s$ after the manner of brake blocks. One system of such annular segments $r$ which almost form a closed ring, is apportioned to the cylindrical inner surface of the fly wheel rim 2, the other system of ring segments $s$ to the cylindrical inner surface of the rim 3 inserted in the casing 4. The ring segments of each system are connected with one another by toggle joint levers $t$, and between adjoining toggle joint levers of the two systems there is disposed the toggle arm rocking lever $v$ carried by the planet wheel carrier and having each arm linked to a toggle joint. The coupling by means of the annular segments $r$ and $s$ is effected by aid of powerful springs $z$ which can be made to act on one or the other system by the lever 28. The lever 28 engages with the sliding sleeve $w$ shiftable on the planet wheel carrier 24. Connected with the sleeve $w$ are the rods $y$, and linked to a third arm of lever $v$. Lever $v$ can thus be turned by means of the lever 28 in such a manner as to actuate the toggle lever of one system, while releasing the toggle lever of the other system. In rocking the lever $v$ the pressure spring $z$ the plates of which are connected with one another by a telescoping rod, is rocked about the pivot disposed intermediate the two coupling rims and the ring systems. The free end of the telescoping rod carries the roller $j$ which runs in contact with the double arm lever $u$ until stopped by the bent down ends of the lever $v$.

What I claim is:

1. A change speed gear comprising a clutch system; said clutch system comprising two clutches; a control lever adapted to uncouple one of said clutches; a hydraulic device controlled by said control lever and adapted to couple the other one of said two clutches; a spring adapted to couple said first clutch and to uncouple said second clutch; and a locking device adapted to lock said clutch system in the position of both said clutches being uncoupled.

2. A change speed gear comprising a clutch system; said clutch system comprising two clutches; means for alternately coupling said clutches; said means comprising a spring adapted to couple the first one of said clutches and to uncouple the second one of said clutches; a hydraulic device adapted to couple said second clutch; a foot lever adapted to uncouple the first one of said clutches and to operate said hydraulic device; and means for locking said clutch system in its in-operative position against the pressure of said spring.

3. A change speed gear comprising a clutch system; said clutch system comprising two clutches, means for alternately coupling said clutches, said means comprising a spring adapted to couple the first one of said clutches and to uncouple the second one of said clutches; a foot lever; and a hydraulic device; said foot lever being adapted to uncouple the first one of said clutches and to operate said hydraulic device, said device comprising a pressure chamber, a valve controlling said pressure chamber and a piston adapted to be moved by hydraulic pressure from said pressure chamber; said piston being adapted by means of intermediate connecting means to couple said second clutch.

4. A change speed gear comprising a clutch system; said clutch system comprising two clutches; means for alternately coupling said clutches; said means comprising a spring adapted to couple the first one of said clutches and to uncouple the second one of said clutches; a foot lever; and a hydraulic device; said foot lever being adapted to uncouple the first one of said clutches and to operate said hydraulic device; said device comprising a pressure chamber, a valve controlling said pressure chamber and a piston adapted to be moved by hydraulic pressure from said pressure chamber; said piston being adapted to cause coupling of said second clutch; and locking means adapted to lock said clutch system in its in-operative position but only in the direction against the pressure exerted by said spring.

5. A change speed gear comprising a change clutch system and adapted to be operated by a foot lever in combination with a hydraulic auxiliary device; the angle of movement of said foot lever being limited by corresponding stops; means for normally holding said clutch system in direct drive; means for uncoupling said direct driving connection on movement of said foot lever over its working angle; means for automatically withdrawing said foot lever to neutral position on release from foot pressure; a spring pressing against said clutch system; means for locking said clutch system in in-operative position against the pressure of said spring adapted to cause coupling of said direct drive; means for causing said hydraulic auxiliary device to couple the second speed of said change clutch system upon new pressure being exerted on said foot lever; and means for again uncoupling said second speed and coupling said direct drive upon the second release of said foot lever.

In testimony whereof I affix my signature.

KARL MAYBACH.